US012785516B2

(12) United States Patent
Yu et al.

(10) Patent No.: US 12,785,516 B2
(45) Date of Patent: Nov. 3, 2026

(54) MOTOR CONTROLLER AND VEHICLE HAVING SAME

(71) Applicant: BYD COMPANY LIMITED, Shenzhen (CN)

(72) Inventors: Fengchuan Yu, Shenzhen (CN); Xingchun Zhang, Shenzhen (CN); Qinghui Zeng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 306 days.

(21) Appl. No.: 18/525,205

(22) Filed: Nov. 30, 2023

(65) Prior Publication Data

US 2024/0113601 A1 Apr. 4, 2024

Related U.S. Application Data

(63) Continuation of application No. PCT/CN2022/099425, filed on Jun. 17, 2022.

(30) Foreign Application Priority Data

Jul. 6, 2021 (CN) ......................... 202121530208.6

(51) Int. Cl.
*H02K 11/33* (2016.01)
*H02K 5/20* (2006.01)
*H02K 9/19* (2006.01)

(52) U.S. Cl.
CPC ............. *H02K 11/33* (2016.01); *H02K 5/203* (2021.01); *H02K 9/19* (2013.01); *H02K 2211/03* (2013.01)

(58) Field of Classification Search
CPC ............................... H02K 11/33; H02K 5/203
See application file for complete search history.

(56) References Cited

U.S. PATENT DOCUMENTS 11,109,518 B2 * 8/2021 Liu .......................... H02K 5/18
11,464,141 B2 * 10/2022 Hoyler ............... H05K 7/20927
(Continued)

FOREIGN PATENT DOCUMENTS

CN 202918228 U 5/2013
CN 108770323 A 11/2018
(Continued)

OTHER PUBLICATIONS

Translation of JP 2009289944 A (Year: 2009).*
(Continued)

*Primary Examiner* — Mukundbhai G Patel
(74) *Attorney, Agent, or Firm* — Sheppard Mullin Richter & Hampton LLP

(57) ABSTRACT

A motor controller includes a first box body including a first surface and a second surface opposite to each other along a thickness direction of the first box body, and includes a cooling water passage that includes a first opening on the first surface. An IGBT module is disposed on the first surface and disposed in the cooling water passage. The motor controller further includes a capacitor disposed on the second surface and connected to the IGBT module, and includes a housing and a capacitor core disposed in the housing. The housing has a heat dissipation opening configured to expose the capacitor core. The motor controller further includes a heat conductor covering the heat dissipation opening. One side of the heat conductor is in contact with the capacitor core, and the other side is in contact with an outer wall surface of the cooling water passage.

18 Claims, 10 Drawing Sheets

(56) References Cited

U.S. PATENT DOCUMENTS

| | | | | |
|---|---|---|---|---|
| 2010/0097765 | A1 * | 4/2010 | Suzuki | B60K 6/445 361/699 |
| 2015/0210158 | A1 | 7/2015 | Brindak et al. | |
| 2017/0194873 | A1 | 7/2017 | Takahashi et al. | |
| 2020/0260611 | A1 | 8/2020 | Liu et al. | |

FOREIGN PATENT DOCUMENTS

| | | | |
|---|---|---|---|
| CN | 109510560 | A | 3/2019 |
| CN | 210167914 | U | 3/2020 |
| CN | 111918528 | A | 11/2020 |
| CN | 211909519 | U | 11/2020 |
| CN | 213027837 | U | 4/2021 |
| CN | 213413503 | U | 6/2021 |
| CN | 215453731 | U | 1/2022 |
| JP | 2004335516 | A | 11/2004 |
| JP | 2009289944 | A | * 12/2009 |
| JP | 2013-192367 | A | 9/2013 |
| JP | 2013220029 | A | 10/2013 |
| JP | 2016007108 | A | 1/2016 |
| WO | 2013136877 | A1 | 9/2013 |
| WO | 2014020806 | A1 | 2/2014 |
| WO | 2014125548 | A1 | 8/2014 |
| WO | 2016027557 | A1 | 2/2016 |

OTHER PUBLICATIONS

Office Action and Search Report dated Jun. 24, 2025, issued in Chilean Patent Application No. 202303833, English machine translation only (20 pages).

Examination Report No. 2 dated Mar. 28, 2025, issued in Australian Patent Application No. 2022306427 (3 pages).

Written Decision on Registration dated Aug. 29, 2025, issued in Korean Patent Application No. 10-2023-7041413, with English machine translation (4 pages).

Notice of Reasons for Refusal dated Jan. 28, 2025, issued in Japanese Patent Application No. 2023-579664, with English machine translation (8 pages).

Extended European Search Report dated September 23, 2024, issued in European Patent Application No. 22836694.4 (9 pages).

Examination Report No. 1 dated Aug. 9, 2024, issued in related Australian Patent Application No. 2022306427 (3 pages).

Request for the Submission of an Opinion dated Apr. 25, 2025, issued in related Korean Patent Application No. 10-2023-7041413, with English machine translation (7 pages).

International Search Report and Written Opinion for Application No. PCT/CN2022/099425, mailed on Sep. 16, 2022, 13 pages.

* cited by examiner

MOTOR CONTROLLER AND VEHICLE HAVING SAME

CROSS-REFERENCE TO RELATED APPLICATIONS

This application is a Continuation application of International Patent Application No. PCT/CN2022/099425, filed on Jun. 17, 2022, which is based on and claims priority to and benefits of Chinese Patent Application No. 202121530208.6, filed on Jul. 6, 2021. The entire content of all of the above-referenced application is incorporated in the present disclosure by reference.

FIELD

The present disclosure relates to the field of vehicles, and in particular, to a motor controller and a vehicle having the same.

BACKGROUND

In the related art, a motor controller generally includes a box body, an insulate-gate bipolar transistor (IGBT) module including one or more IGBT modules, and a capacitor. In the motor controller, a cooling water passage is provided in the box body to dissipate heat for the IGBT module and the capacitor. However, the capacitor cannot be in direct contact with a coolant, and the heat dissipated by the capacitor cannot be transmitted to the cooling water passage quickly. As a result, in the related art, the heat dissipation efficiency of the cooling water passage of the motor controller for the capacitor is low, and a working state of the capacitor is affected.

SUMMARY

The present disclosure resolves at least one of technical problems existing in the related art. Based on this, a first aspect of the present disclosure provides a motor controller, and the motor controller has advantages such as a small volume, a light weight, low costs, and high cooling efficiency.

A second aspect of the present disclosure further provides a vehicle having the motor controller.

According to a first aspect of the present disclosure, an embodiment provides a motor controller. The motor controller includes: a first box body, where the first box body includes a first surface and a second surface that are opposite to each other along a thickness direction of the first box body, the first box body includes a cooling water passage, and the cooling water passage includes at least one first opening on the first surface; at least one IGBT module, where the at least one IGBT module is disposed on the first surface and is inserted into the cooling water passage through the at least one first opening; a capacitor, where the capacitor is disposed on the second surface and is connected to the IGBT module, the capacitor includes a housing and a capacitor core, the capacitor core is disposed in the housing, and the housing includes a heat dissipation opening configured to expose the capacitor core; and a heat conductor, where the heat conductor covers the heat dissipation opening, and a first side surface of the heat conductor is in contact with the capacitor core and a second side surface of the heat conductor is in contact with an outer wall surface of the cooling water passage.

The motor controller according to the embodiments of the present disclosure has advantages such as a small volume, a light weight, low costs, and high cooling efficiency.

According to some embodiments of the present disclosure, the heat conductor includes at least one of a heat conducting plate or a heat conducting mud.

According to some embodiments of the present disclosure, the heat conductor includes the heat conducting plate and the heat conducting mud; and the heat conducting plate and the heat conducting mud are stacked along a direction from the capacitor core to the outer wall surface of the cooling water passage.

According to some embodiments of the present disclosure, a surface of the capacitor that faces the second surface includes a heat dissipation protrusion, the second surface includes a heat dissipation recess, the heat dissipation protrusion matches the heat dissipation recess, and the heat dissipation opening is disposed on the heat dissipation protrusion.

According to some embodiments of the present disclosure, the first box body includes an accommodating groove, the second surface forms a groove bottom of the accommodating groove, the capacitor is disposed in the accommodating groove, a capacitor cover plate is mounted on the first box body, and the capacitor cover plate covers the accommodating groove.

According to some embodiments of the present disclosure, the cooling water passage includes at least one transition cavity and multiple cooling cavities that are in communication with each other, the transition cavity and the cooling cavities are alternately arranged along an extension direction of the cooling water passage, and each of the cooling cavities includes the first opening on the first surface; the motor controller further includes a multiple IGBT modules and multiple heat conductors, and the multiple IGBT modules are respectively inserted into the multiple cooling cavities through the multiple first openings; and the housing includes multiple heat dissipation openings, the multiple heat conductors respectively cover the multiple heat dissipation openings, a first side surface of each of the heat conductors is in contact with the capacitor core, and a second side surface of each of the heat conductors is in contact with an outer wall surface of a corresponding cooling cavity.

According to some embodiments of the present disclosure, each IGBT module includes an insertion portion and a mounting portion that are connected to each other, a cross-sectional area of the mounting portion is greater than a cross-sectional area of the insertion portion, the mounting portion is located outside the corresponding cooling cavity and is mounted on the first surface, and the insertion portion is inserted into a corresponding cooling cavity through a corresponding first opening.

According to some embodiments of the present disclosure, the first surface includes multiple sealing grooves, the multiple sealing grooves respectively surround the multiple first openings, and a sealing ring configured to seal a corresponding IGBT module is disposed in each sealing groove.

According to some embodiments of the present disclosure, the motor controller further includes: a water passage cover plate, where the transition cavity includes a second opening on the second surface, and the water passage cover plate is mounted on the second surface and covers the second opening.

According to some embodiments of the present disclosure, the transition cavity includes a connection section and an open section, the second opening is disposed on the open section, the connection section is disposed on two ends of the open section and is in communication with an adjacent cooling cavity, and the open section offsets toward the second surface with respect to the adjacent cooling cavity.

According to some embodiments of the present disclosure, the at least one transition cavity and the multiple cooling cavities are disposed along a length direction of the first box body.

According to some embodiments of the present disclosure, the motor controller further includes: a water inlet pipe and a water outlet pipe, where the water inlet pipe and the water outlet pipe are respectively connected to two ends of the first box body along the length direction of the first box body, the first box body includes a water inlet channel and a water outlet channel, the water inlet channel is connected to the water inlet pipe and a first cooling cavity that is closest to the water inlet pipe, and the water outlet channel is connected to the water outlet pipe and a second cooling cavity that is closest to the water outlet pipe.

According to some embodiments of the present disclosure, the water inlet channel includes a first water inlet section and a second water inlet section, the first water inlet section is connected to the water inlet pipe, the second water inlet section is connected to the first water inlet section and the first cooling cavity, and the first water inlet section offsets the second surface with respect to the first cooling cavity; and the water outlet channel includes a first water outlet section and a second water outlet section, the first water outlet section is connected to the water outlet pipe, the second water outlet section is connected to the first water outlet section and the second cooling cavity, and the first water outlet section offsets toward the second surface with respect to the second cooling cavity.

According to some embodiments of the present disclosure, the motor controller further includes: multiple drive boards disposed on the first surface, and the drive boards being respectively connected to the multiple IGBT modules; a second box body, where the second box body is mounted on the first box body, and the multiple drive boards are located between the second box body and the first box body; a control board, where the control board is located on a surface of the second box body that faces away from the first box body and is connected to the multiple drive boards; and a control cover plate, where the control cover plate is mounted on the second box body, and the control board is located between the control cover plate and the second box body.

According to a second aspect of the present disclosure, an embodiment provides a vehicle, including the motor controller according to the embodiments of the first aspect of the present disclosure.

The vehicle according to the embodiments of the second aspect of the present disclosure utilizes the motor controller described in the embodiments of the first aspect of the present disclosure, so that the vehicle has advantages such as a small volume, a light weight, low costs, and high cooling efficiency.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings. In the accompanying drawings.

REFERENCE NUMERALS

Figure 1:
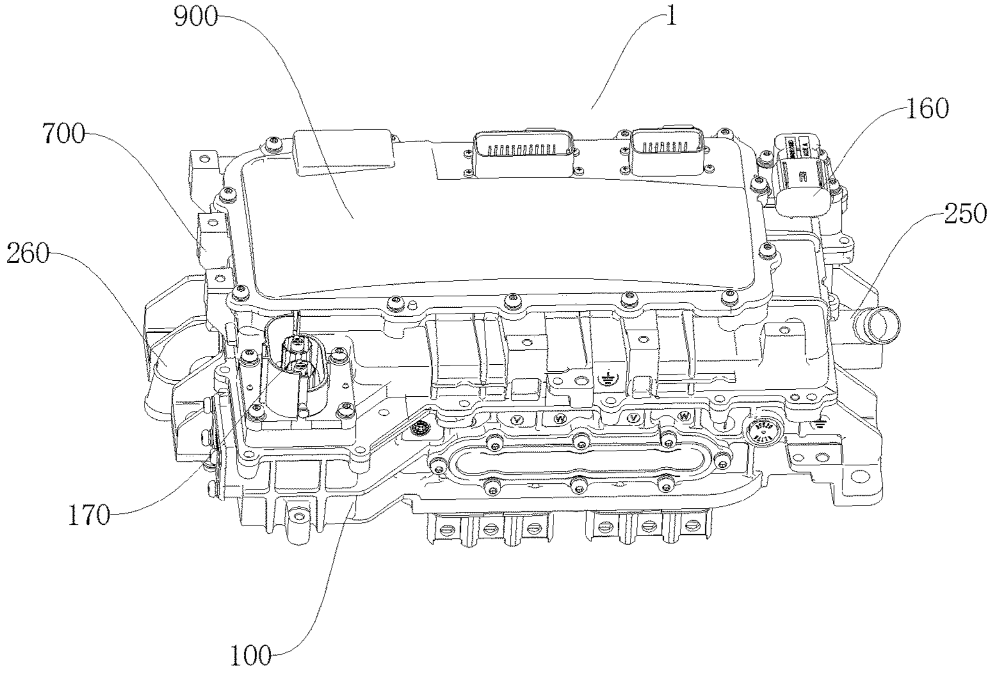
FIG. 1 is a schematic structural diagram of a motor controller according to an embodiment of the present disclosure.

Motor controller 1, Motor assembly 2, Motor 3,

First box body 100, First surface 110, Second surface 120, Heat dissipation recess 121, Accommodating groove 122, Sealing groove 130, Sealing ring 131, Signal connector 140, Electric assembly signal connector 150, Power distribution connector 160, Direct-current bus connector 170, Bleeder resistor 180, Direct-current conductive bar 190, Magnetic ring 191, Insulating glue 192, Insulating member 193, Fastener 194, Cooling water passage 200, First opening 210, Transition cavity 220, Connection section 221, Open section 222, Cooling cavity 230, Second opening 240, Water passage cover plate 241, Water inlet pipe 250, Water outlet pipe 260, Water inlet channel 270, First water inlet section 271, Second water inlet section 272, Water outlet channel 280, First water outlet section 281, Second water outlet section 282, IGBT module 300, Insertion portion 310, Mounting portion 320, Heat conducting member 330 (e.g., a heat conductor), Heat conducting plate 331, Heat conducting mud 332, Three-phase conductive bar 340, Three-phase connection bar 350, Hall 360, Capacitor 400, Housing 410, Heat dissipation opening 411, Capacitor core 420, Heat dissipation protrusion 430, Ground conductive bar 440, Input port 460, Power distribution port 450, Capacitor cover plate 500, Drive board 600, Second box body 700, Control board 800, Control cover plate 900.

DETAILED DESCRIPTION

The following describes the embodiments of the present disclosure in detail, and the embodiments described with reference to the accompanying drawings are exemplary.

In the description of the present disclosure, it should be understood that orientation or position relationships indicated by the terms such as “center”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise”, “anticlockwise”, “axial”, “radial”, and “circumferential” are based on orientation or position relationships shown in the accompanying drawings, and are used only for describing the present disclosure and simplifying the description, rather than indicating or implying that the mentioned apparatus or element must have a particular orientation or must be constructed and operated in a particular orientation. Therefore, such terms should not be construed as a limitation on the present disclosure.

In the description of the present disclosure, “multiple” means two or more than two.

The following describes a motor controller 1 according to the embodiments of the present disclosure with reference to the accompanying drawings.

As shown in FIG. 1 to FIG. 12, the motor controller 1 includes a first box body 100, at least one IGBT module 300, a capacitor 400, and a heat conducting member 330.

The first box body 100 includes a first surface 110 and a second surface 120 that are opposite to each other along a thickness direction of the first box body. The first box body 100 is provided with or includes a cooling water passage 200, and the cooling water passage 200 includes at least one first opening 210 on the first surface 110. The at least one IGBT module 300 is arranged/disposed on the first surface 110 and is inserted into the cooling water passage 200 through the at least one first opening 210. The capacitor 400 is arranged on the second surface 120 and is connected to the IGBT module 300, the capacitor 400 includes a housing 410 and a capacitor core 420, the capacitor core 420 is arranged in the housing 410, and the housing 410 is provided with a heat dissipation opening 411 configured to expose the capacitor core 420. The heat conducting member 330 covers the heat dissipation opening 411, and one side (e.g., a first side surface) of the heat conducting member 330 is in contact with the capacitor core 420 to conduct heat and the other side (e.g., a second side surface) of the heat conducting member 330 is in contact with an outer wall surface of the cooling water passage 200 to conduct heat.

A coolant may be introduced into the cooling water passage 200, and the coolant can flow in the cooling water passage 200.

In the motor controller 1 according to the embodiments of the present disclosure, the first box body 100 is provided with a first surface 110 and a second surface 120 that are opposite to each other along the thickness direction of the first box body, and the first box body 100 is provided with a cooling water passage 200. The first surface 110 and the second surface 120 are spaced, and space configured to accommodate components may be respectively constructed on the first surface 110 and the second surface 120 of the first box body 100. The cooling water passage 200 includes at least one first opening 210 on the first surface 110, and the at least one IGBT module 300 is arranged on the first surface 110 and is inserted into the cooling water passage 200 through the at least one first opening 210. A quantity of the first openings 210 may correspond to a quantity of the IGBT modules 300, and each IGBT module 300 is inserted into the cooling water passage 200 through a corresponding first opening 210 and heat thereof is dissipated by the coolant in the cooling water passage 200. Therefore, the IGBT module 300 can be directly immersed in the coolant of the cooling water passage 200, so that a heat exchange area between the IGBT module 300 and the coolant is great, which helps improve the heat dissipation efficiency of the IGBT module 300.

In addition, the IGBT module 300 is arranged on the first surface 110, the capacitor 400 is arranged on the second surface 120 and is connected to the IGBT module 300, and the capacitor 400 is adjacent to the cooling water passage 200 and heat thereof is dissipated by the coolant in the cooling water passage 200. In this way, a distance between the IGBT module 300 and the capacitor 400 is increased, and electromagnetic interference between the IGBT module 300 and the capacitor 400 can be reduced, thereby achieving a better shielding effect.

In addition, the capacitor 400 includes a housing 410 and a capacitor core 420, the capacitor core 420 is arranged in the housing 410, the housing 410 is configured to prevent the capacitor core 420 from being damaged, during working of the capacitor 400, the capacitor core 420 generates heat, and the housing 410 is provided with a heat dissipation opening 411 configured to expose the capacitor core 420. In this way, the heat of the capacitor core 420 can be quickly released to the outside through the heat dissipation opening 411. The heat conducting member 330 covers the heat dissipation opening 411, and one side of the heat conducting member 330 is in contact with the capacitor core 420 to conduct heat and the other side is in contact with the outer wall surface of the cooling water passage 200 to conduct heat. In an embodiment, the heat dissipation opening 411 may be provided or disposed on one side of the housing 410 that faces the second surface 120, and the heat conducting member 330 can block the capacitor core 420, to prevent the capacitor core 420 from being exposed from the housing 410. In addition, the heat conducting efficiency of the heat conducting member 330 is higher than the heat conducting efficiency of the housing 410, the two opposite sides of the heat conducting member 330 are respectively in contact with the capacitor core 420 and the outer wall surface of the cooling water passage 200, so that the heat of the capacitor core 420 may be quickly transmitted to the cooling water passage 200 through the heat conducting member 330, and the heat dissipation efficiency of the cooling water passage 200 for the capacitor core 420 of the capacitor 400 may be further improved.

In this way, the heat of the capacitor core 420 of the capacitor 400 can be quickly dissipated, and the working efficiency of the capacitor 400 is further improved. Therefore, a capacity of the capacitor core 420 of the capacitor 400 may be reduced, a capacity and a volume of the capacitor 400 may be correspondingly reduced, and costs may also be reduced. Therefore, a volume, a weight, and costs of the motor controller 1 may be reduced.

In this way, the motor controller 1 according to the embodiments of the present disclosure has advantages such as a small volume, a light weight, low costs, and high cooling efficiency.

Figure 2:
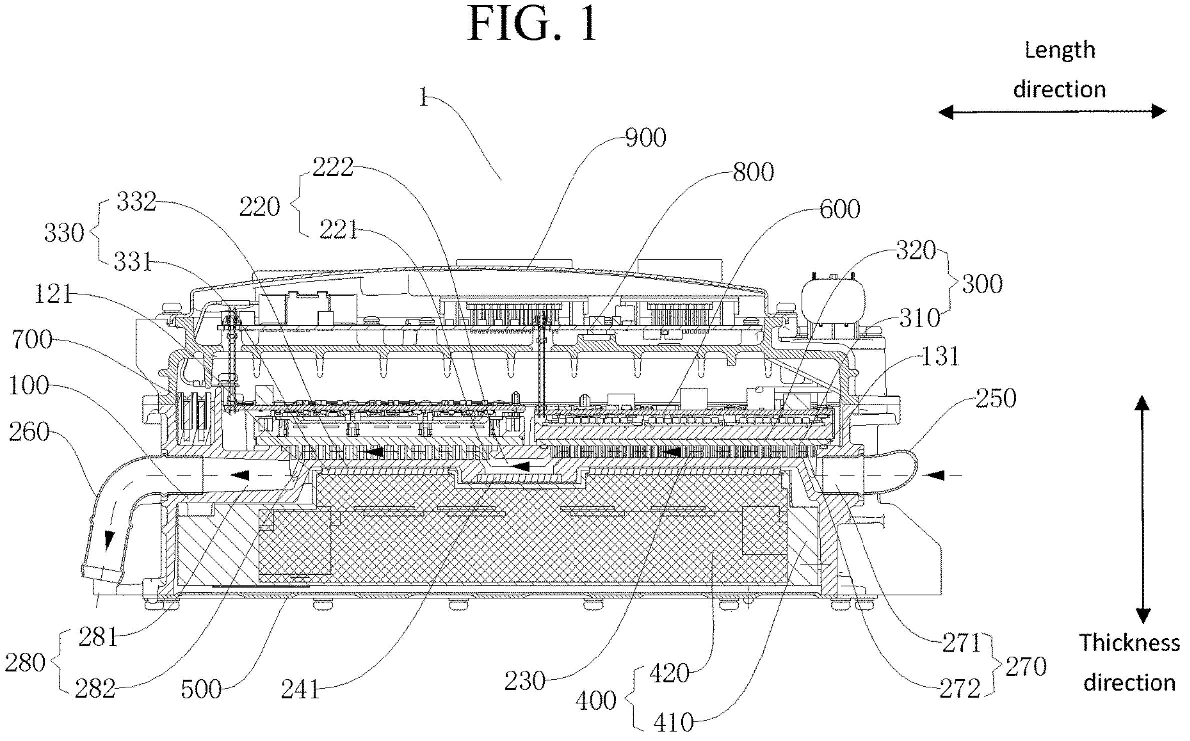
FIG. 2 is a sectional view of a motor controller according to an embodiment of the present disclosure.
Figure 3:
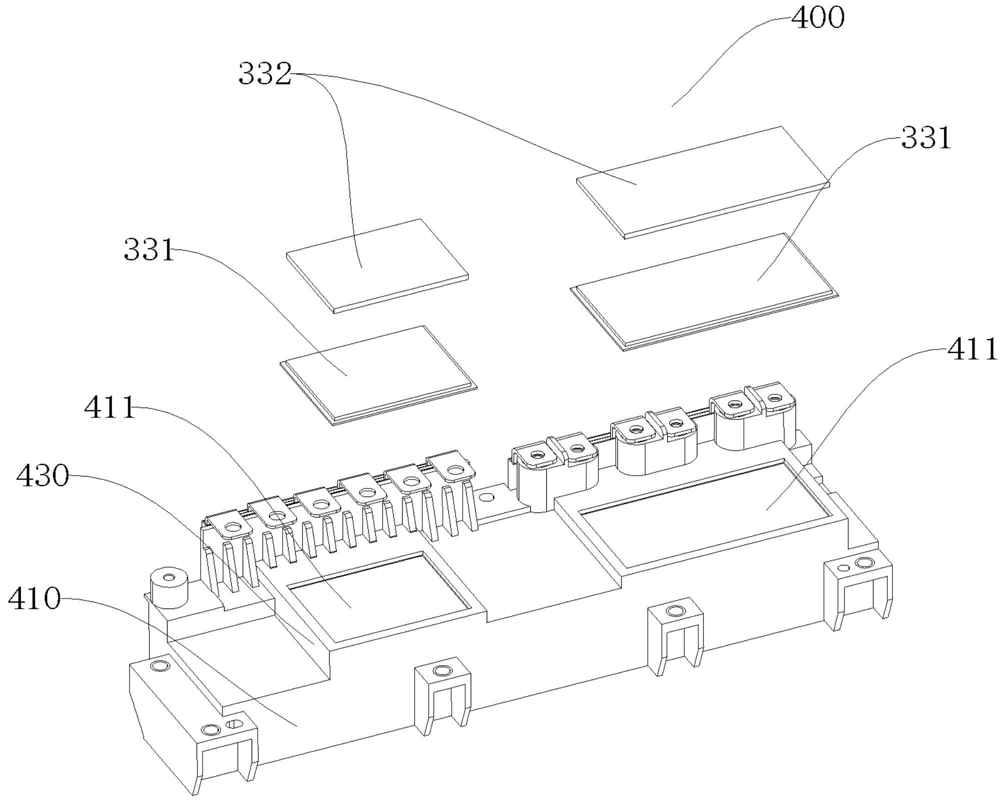
FIG. 3 is an exploded view of a capacitor and a heat conducting member of a motor controller according to an embodiment of the present disclosure.

According to some embodiments of the present disclosure, as shown in FIG. 2 and FIG. 3, the heat conducting member 330 includes at least one of a heat conducting plate 331 and heat conducting mud 332. The heat conducting plate 331 may be made of metal copper, metal aluminum, or an aluminum alloy material. The heat dissipation opening 411 may be covered by the heat conducting plate 331 and the heat conducting mud 332, and the heat dissipation efficiency of the heat conducting member 330 is ensured, so that heat of the capacitor 400 can be quickly dissipated through the heat conducting member 330.

In an embodiment, as shown in FIG. 2 and FIG. 3, the heat conducting member 330 includes the heat conducting plate 331 and the heat conducting mud 332, and the heat conducting plate 331 and the heat conducting mud 332 are sequentially stacked along a direction from the capacitor core 420 to the outer wall surface of the cooling water passage 200. That is, the heat conducting plate 331 is arranged on a side of the capacitor core 420 that faces the second surface 120, and the heat conducting mud 332 is arranged on a side of the heat conducting plate 331 that faces away from the capacitor core 420.

In this way, the heat conducting plate 331 can transmit the heat of the capacitor core 420 to the heat conducting mud 332 and then transmit the heat to the coolant in the cooling water passage 200 through the heat conducting mud 332, and the heat conducting plate 331 may cover the heat dissipation opening 411. In addition, the heat conducting mud 332 is more easily deformable compared with the heat conducting plate 331. An interval may exist between the heat conducting plate 331 and the second surface 120, so that rigid contact between the heat conducting plate 331 and the second surface 120 can be avoided. The heat conducting mud 332 is filled in the interval, so that a processing error of the heat conducting plate 331, a processing error of the second surface 120, and an assembly error between the heat conducting plate 331 and the second surface 120 can be compensated for, the assembly precision is higher, and the heat conducting efficiency between the capacitor core 420 and the cooling water passage 200 can be ensured.

According to some embodiments of the present disclosure, as shown in FIG. 2 and FIG. 3, a surface of the capacitor 400 that faces the second surface 120 is provided with a heat dissipation protrusion 430, the second surface 120 is provided with a heat dissipation recess 121, and the heat dissipation protrusion 430 matches the heat dissipation recess 121.

The heat dissipation protrusion 430 protrudes from the surface of the capacitor 400 that faces the second surface 120, the heat dissipation recess 121 is recessed by the second surface 120 toward a direction away from the capacitor 400, and a shape of the heat dissipation protrusion 430 may match a shape of the heat dissipation recess 121, so that the heat dissipation protrusion 430 can match the heat dissipation recess 121 to mount and fix the capacitor 400.

In addition, through matching between the heat dissipation protrusion 430 and the heat dissipation recess 121, a contact area between the housing 410 of the capacitor 400 and the second surface 120 can be increased, that is, a contact area between the capacitor 400 and the outer wall surface of the cooling water passage 200 is increased, so that the heat dissipation efficiency of the cooling water passage 200 for the capacitor 400 is further ensured, and a better heat dissipation effect is achieved.

In addition, the heat dissipation opening 411 is provided/disposed on the heat dissipation protrusion 430. In this way, a heat exchange area between the heat conducting member 330 and the outer wall surface of the cooling water passage 200 can be increased, and the heat conducting efficiency between the capacitor 400 and the cooling water passage 200 is further improved.

Figure 4:
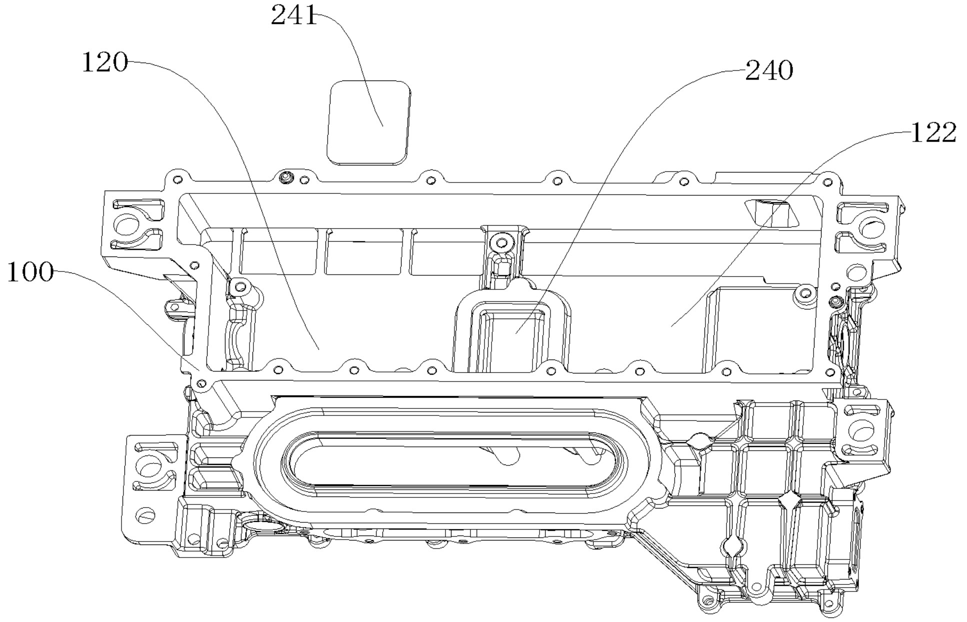
FIG. 4 is a schematic structural diagram of a first box body of a motor controller according to an embodiment of the present disclosure.

According to some embodiments of the present disclosure, as shown in FIG. 4, the first box body 100 is provided with an accommodating groove 122, the second surface 120 forms a groove bottom of the accommodating groove 122, and the capacitor 400 is arranged in the accommodating groove 122. In this way, on one hand, structure arrangement of the motor controller 1 can be more compact and the volume of the motor controller 1 can be reduced, and on the other hand, relative positions between the capacitor 400 and the first box body 100 can be fixed.

In addition, a capacitor cover plate 500 is mounted on the first box body 100, and the capacitor cover plate 500 is configured to cover the accommodating groove 122. In this way, the capacitor cover plate 500 may fix the capacitor 400 and prevent the capacitor 400 from separating from the accommodating groove 122, and the capacitor cover plate 500 may further play a shielding role to prevent interference between the capacitor 400 and other electrical members, so that an electromagnetic compatibility effect is further improved.

According to some embodiments of the present disclosure, as shown in FIG. 2, the cooling water passage 200 includes at least one transition cavity 220 and multiple cooling cavities 230 that are in communication with each other, the transition cavity 220 and the cooling cavities 230 are alternately arranged along an extension direction of the cooling water passage 200, and each cooling cavity 230 includes the first opening 210 on the first surface 110.

In an embodiment, the transition cavity 220 may connect two adjacent cooling cavities 230, and a quantity of the cooling cavities 230 may be greater than a quantity of the transition cavities 220. The multiple IGBT modules 300 are respectively inserted into the multiple cooling cavities 230 through the multiple first openings 210. The IGBT module 300 is in direct contact with a coolant in the cooling cavity 230, and the coolant may flow in two adjacent cooling cavities 230 through the transition cavity 220. Therefore, it is ensured that the coolant in the cooling cavity 230 can be in a flow state, and the flowing coolant can better dissipate heat for the IGBT module 300 and the capacitor 400.

In addition, the housing 410 is provided with multiple heat dissipation openings 411, there are multiple heat conducting members 330 and the multiple heat conducting members respectively cover the multiple heat dissipation openings 411, one side (e.g., a first side surface) of each heat conducting member 330 is in contact with the capacitor core 420 to conduct heat, and the other side (e.g., a second side surface) of each heat conducting member 330 is in contact with an outer wall surface of a corresponding cooling cavity 230 to conduct heat. In this way, the heat of the capacitor core 420 of the capacitor 400 may be dissipated through the multiple heat conducting members 330 and the cooling water passage 200, and the multiple heat dissipation openings 411 can increase a heat exchange area between the capacitor core 420 and the outer wall surface of the cooling water passage 200, thereby further improving the heat dissipation efficiency of the cooling water passage 200 for the capacitor 400.

In an embodiment, each IGBT module 300 includes an insertion portion 310 and a mounting portion 320 that are connected to each other, a cross-sectional area of the mounting portion 320 is greater than a cross-sectional area of the insertion portion 310, the mounting portion 320 is located outside the corresponding cooling cavity 230 and is mounted on the first surface 110, and the insertion portion 310 is inserted into a corresponding cooling cavity 230 through a corresponding first opening 210.

For example, the mounting portion 320 may match the first surface 110 through a threaded fastening member (for example, a bolt). In this way, on one hand, the IGBT module 300 may be fixedly connected to the first box body 100, and after the insertion portion 310 is inserted into the cooling cavity 230, the mounting portion 320 may further cover the cooling cavity 230 to reduce a probability that the coolant is leaked from the first opening 210; and on the other hand, the mounting portion 320 of the IGBT module 300 extends out from the cooling cavity 230, so that a region that can be held by a human hand is large, which helps disassemble and assemble the IGBT module 300.

Figure 5:
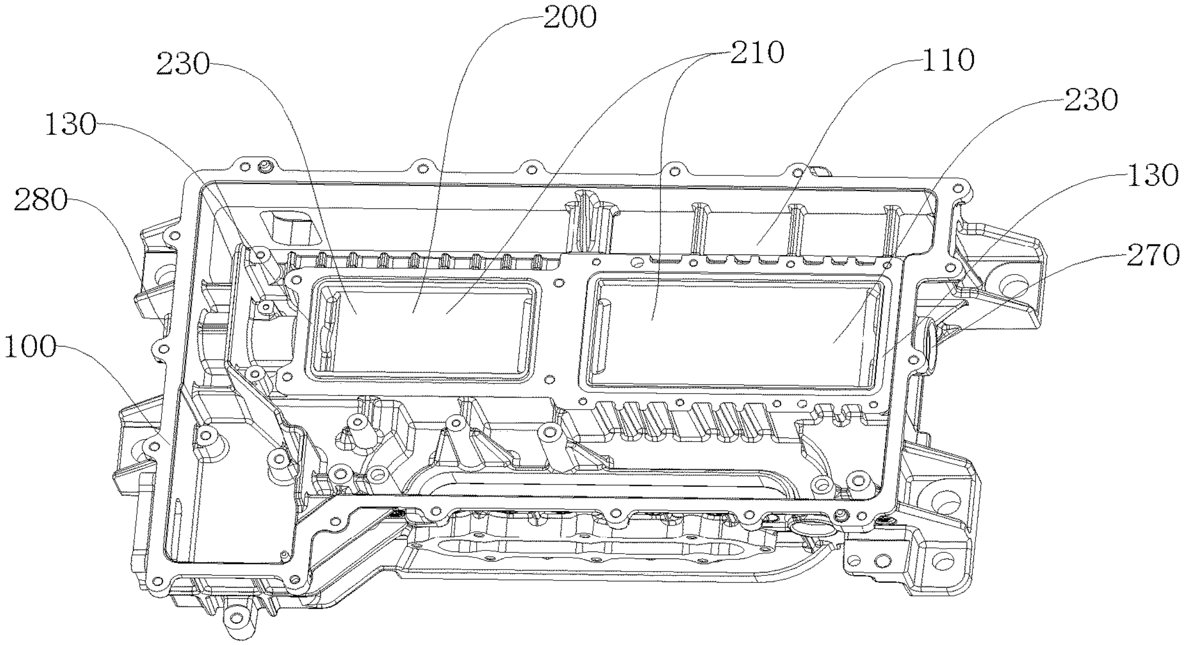
FIG. 5 is a schematic structural diagram of a first box body of a motor controller from another perspective according to an embodiment of the present disclosure.

Further, as shown in FIG. 5, the first surface 110 is provided with multiple sealing grooves 130, the multiple sealing grooves 130 respectively surround the multiple first openings 210, and a sealing ring 131 configured to seal a corresponding IGBT module 300 is arranged in each sealing groove 130. That is, the sealing ring 131 seals a gap between the first surface 110 and the IGBT module 300.

For example, the sealing ring 131 may protrude from the first surface 110, and after the insertion portion 310 is inserted into the cooling cavity 230, the mounting portion 320 and a groove wall of the sealing groove 130 together squeeze the sealing ring 131 to cause the sealing ring 131 to be elastically deformed, so that sealing between the first surface 110 and the IGBT module 300 is implemented, and the coolant is effectively prevented from leaking out from the first opening 210. Therefore, the sealing performance is higher, and the reliability of a motor controller is ensured.

According to some embodiments of the present disclosure, as shown in FIG. 2 and FIG. 4, the motor controller 1 further includes a water passage cover plate 241, where the transition cavity 220 includes a second opening 240 on the second surface 120, and the water passage cover plate 241 is mounted on the second surface 120 and covers the second opening 240.

By providing the second opening 240, construction of the transition cavity 220 can be facilitated, and the difficulty in communicating the transition cavity 220 with the cooling cavity 230 is reduced. In addition, the second opening 240 is provided on the second surface 120. In this way, when the water passage cover plate 241 covers the second opening 240, when the water passage cover plate 241 is mounted, no interference may be caused to the IGBT module 300, and disassembly and assembly of the IGBT module 300 may not cause interference to the water passage cover plate 241, so that disassembly and assembly of the IGBT module 300 become more convenient. In addition, the first surface 110 can include a larger area for mounting the IGBT module 300.

The water passage cover plate 241 may be welded to the second surface 120 in a friction welding manner, so that a connection between the water passage cover plate 241 and the box body is more reliable, relative displacement between the water passage cover plate 241 and the first box body 100 during shaking and traveling of a vehicle can be avoided, and a covering effect of the water passage cover plate 241 on the second opening 240 is better.

In an embodiment, as shown in FIG. 2 and FIG. 4, the transition cavity 220 includes a connection section 221 and an open section 222, the second opening 240 is provided on the open section 222, the connection section 221 is respectively arranged on two ends of the open section 222 and is in communication with an adjacent cooling cavity 230, and the open section 222 offsets toward the second surface 120 with respect to the adjacent cooling cavity 230.

By arranging the connection section 221, flowing of the coolant between the cooling cavity 230 and the open section 222 is smoother. The open section 222 offsets toward the direction of the second surface 120 relative to the cooling cavity 230. In this way, the second opening 240 may be provided on the second surface 120, and disassembly and assembly of the water passage cover plate 241 becomes more convenient. In addition, a center of the open section 222 and a center of an adjacent cooling cavity 230 are not located on a same straight line, so that when the coolant flows from the cooling cavity 230 into the transition cavity 220 or the coolant flows from the transition cavity 220 into the cooling cavity 230, a flowing speed of the coolant can be reduced, and the coolant can be fully utilized. In addition, a thickness of a side wall of the transition cavity 220 that is close to the first surface 110 can be ensured, so that a probability that the side wall of the transition cavity 220 that is close to the first surface 110 is damaged is reduced.

In some embodiments of the present disclosure, as shown in FIG. 2, the at least one transition cavity 220 and the multiple cooling cavities 230 are arranged along a length direction of the first box body 100.

The at least one transition cavity 220 and the multiple cooling cavities 230 may be arranged in a "straight" shape. It may be understood that, a size of the first box body 100 in the length direction is maximum. Therefore, when arranged along the length direction of the first box body 100, there are sufficient arrangement space provided for the transition cavity 220 and the cooling cavity 230, so that a sufficient quantity of cooling cavities 230 may be arranged, to fully accommodate the IGBT module 300. In addition, there is no need to arrange the at least one transition cavity 220 and the multiple cooling cavities 230 in multiple rows, so that structure arrangement is simpler and is easy to implement, and flowing of the coolant in the at least one transition cavity 220 and the multiple cooling cavities 230 that are in a same row is smoother.

Figure 6:
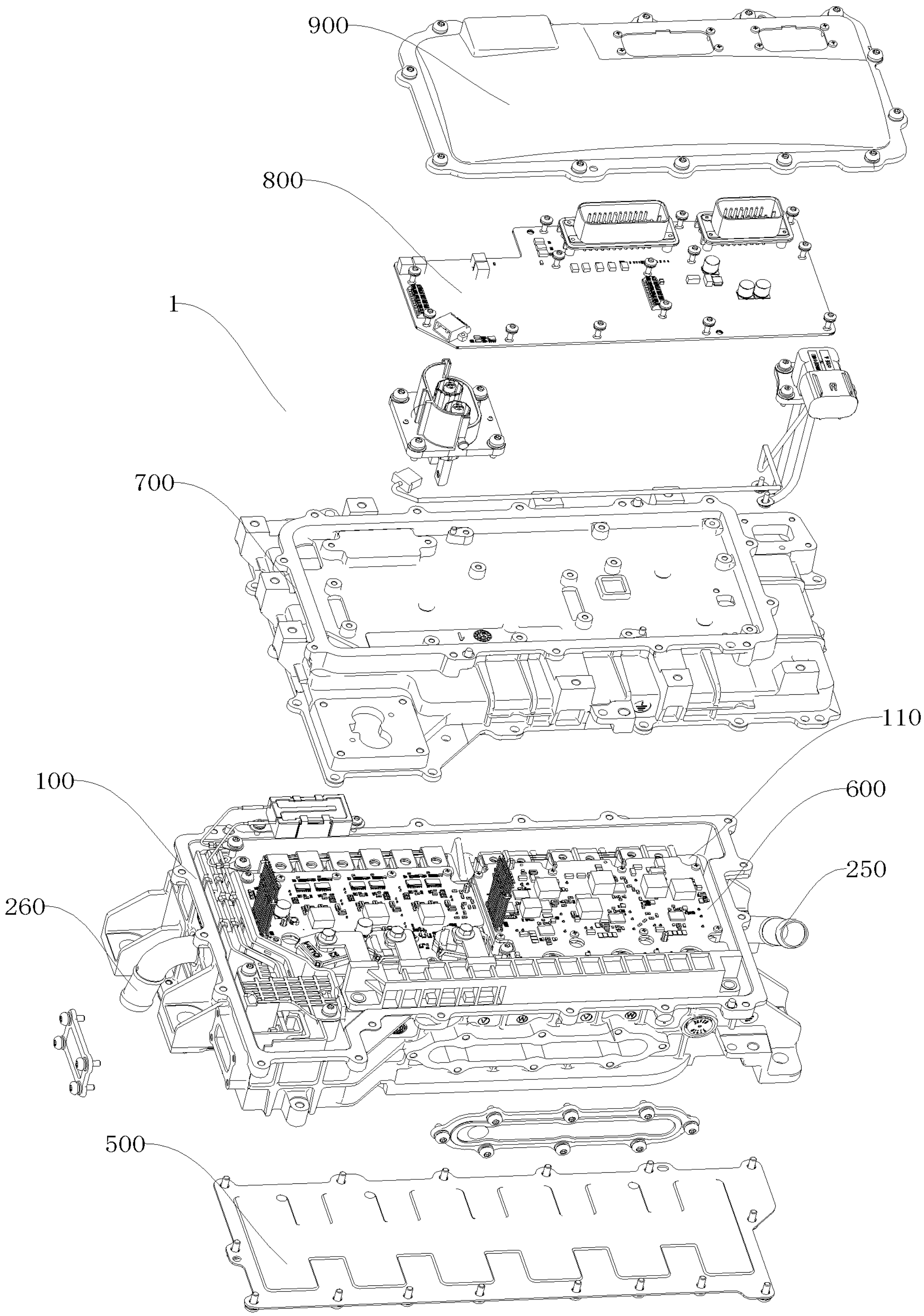
FIG. 6 is an exploded view of a motor controller according to an embodiment of the present disclosure.
Figure 7:
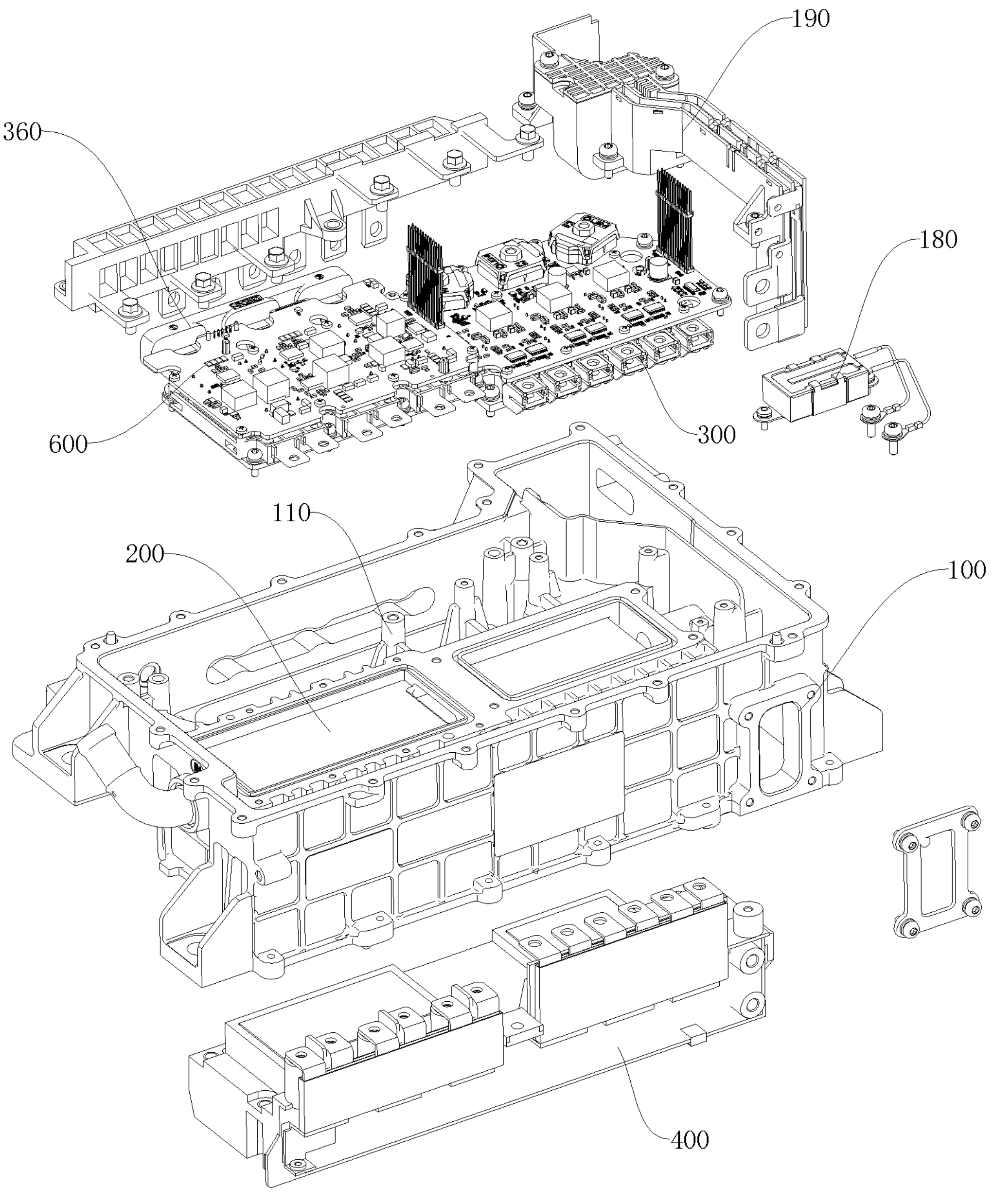
FIG. 7 is an exploded view of a first box body, a capacitor, and an IGBT module of a motor controller according to an embodiment of the present disclosure.
Figure 8:
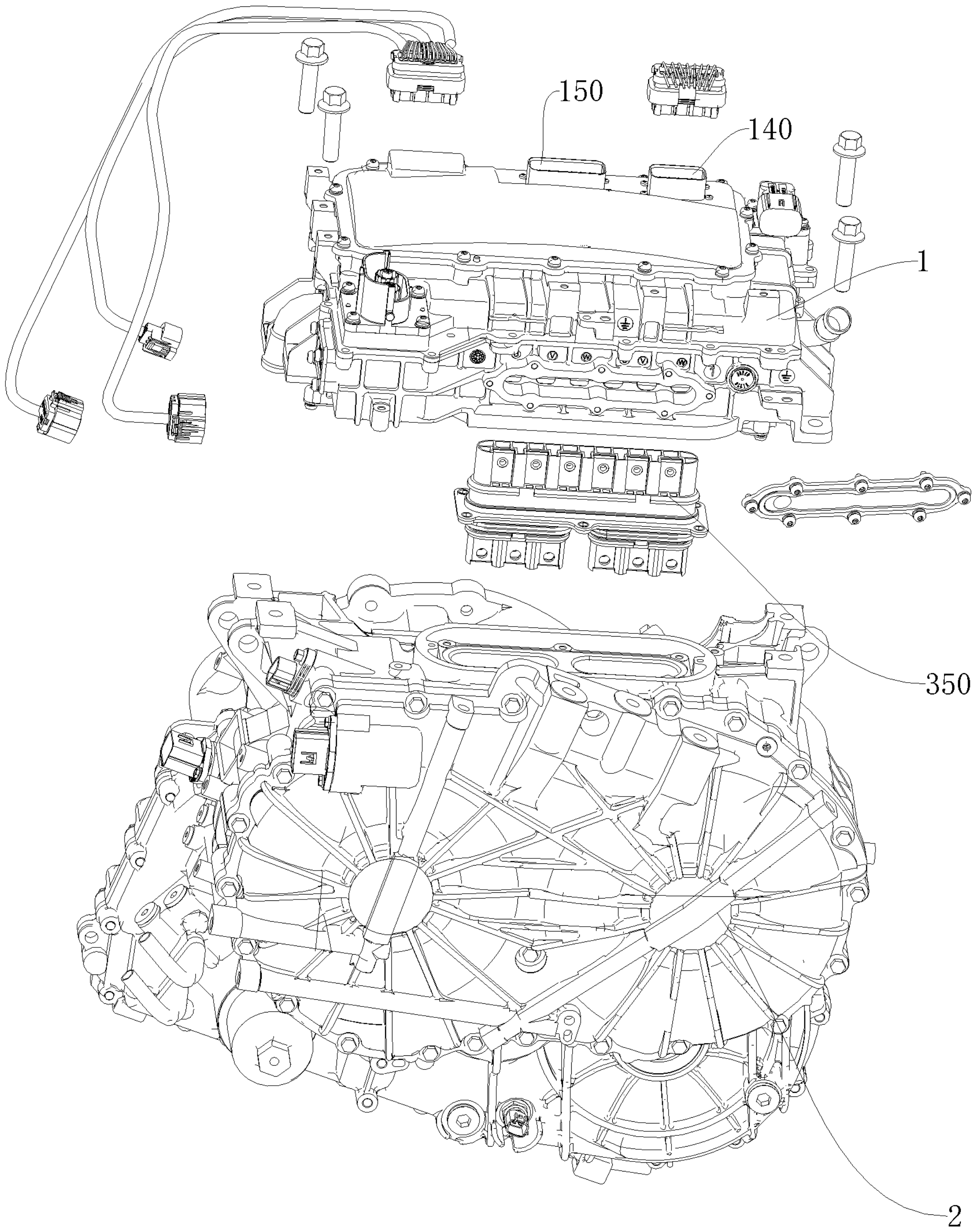
FIG. 8 is an exploded view of a motor controller and a motor assembly according to an embodiment of the present disclosure.
Figure 9:
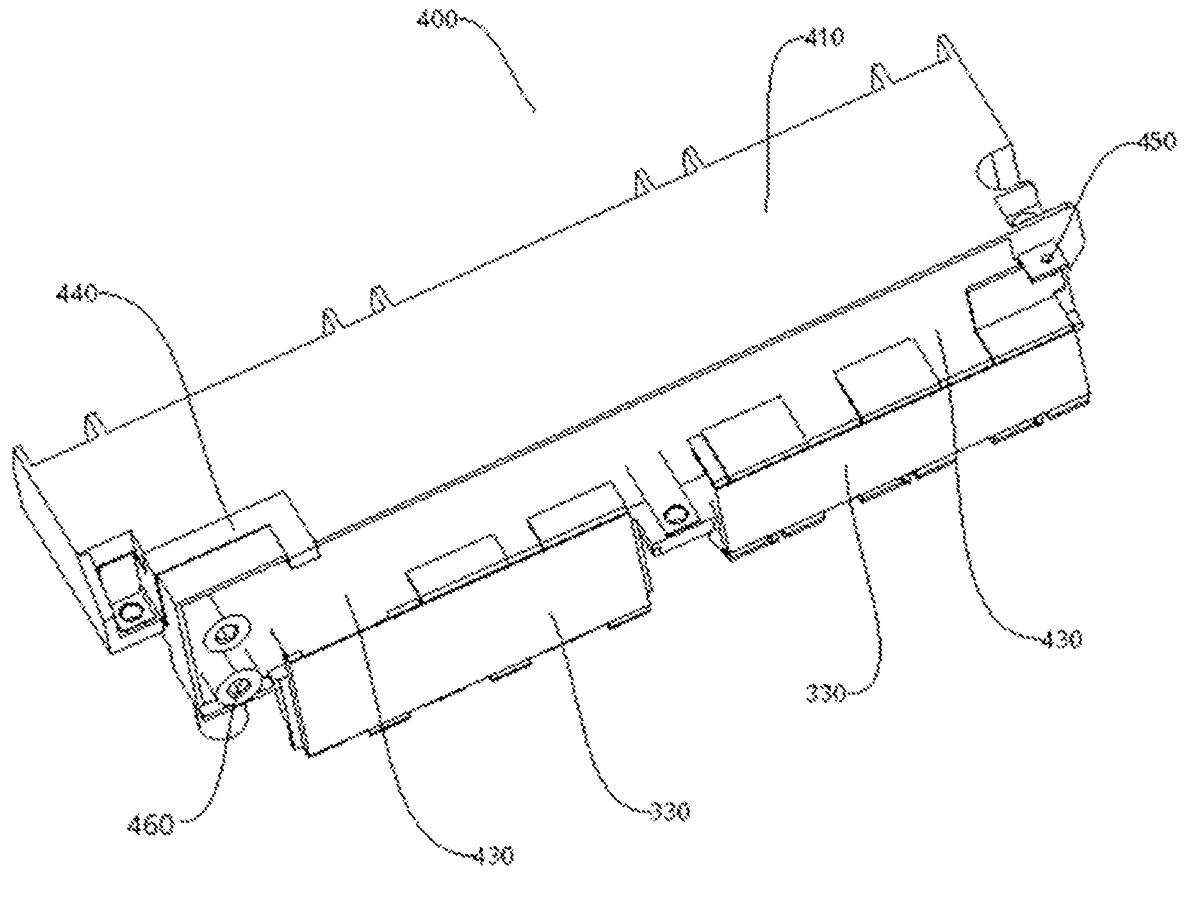
FIG. 9 is a schematic structural diagram of a capacitor of a motor controller according to an embodiment of the present disclosure.
Figure 10:
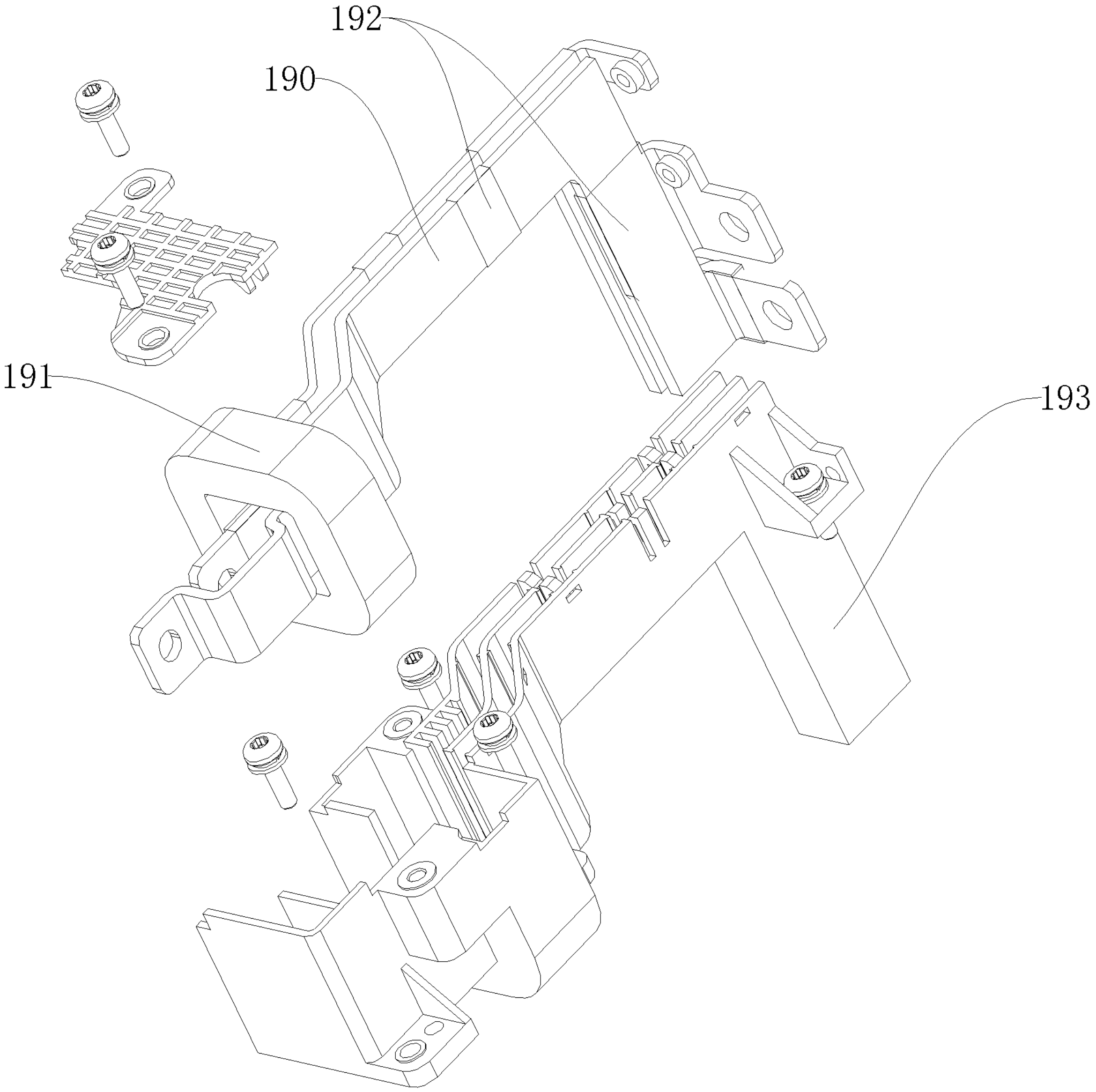
FIG. 10 is an exploded view of a direct-current conductive bar and an insulating member of a motor controller according to an embodiment of the present disclosure.
Figure 11:
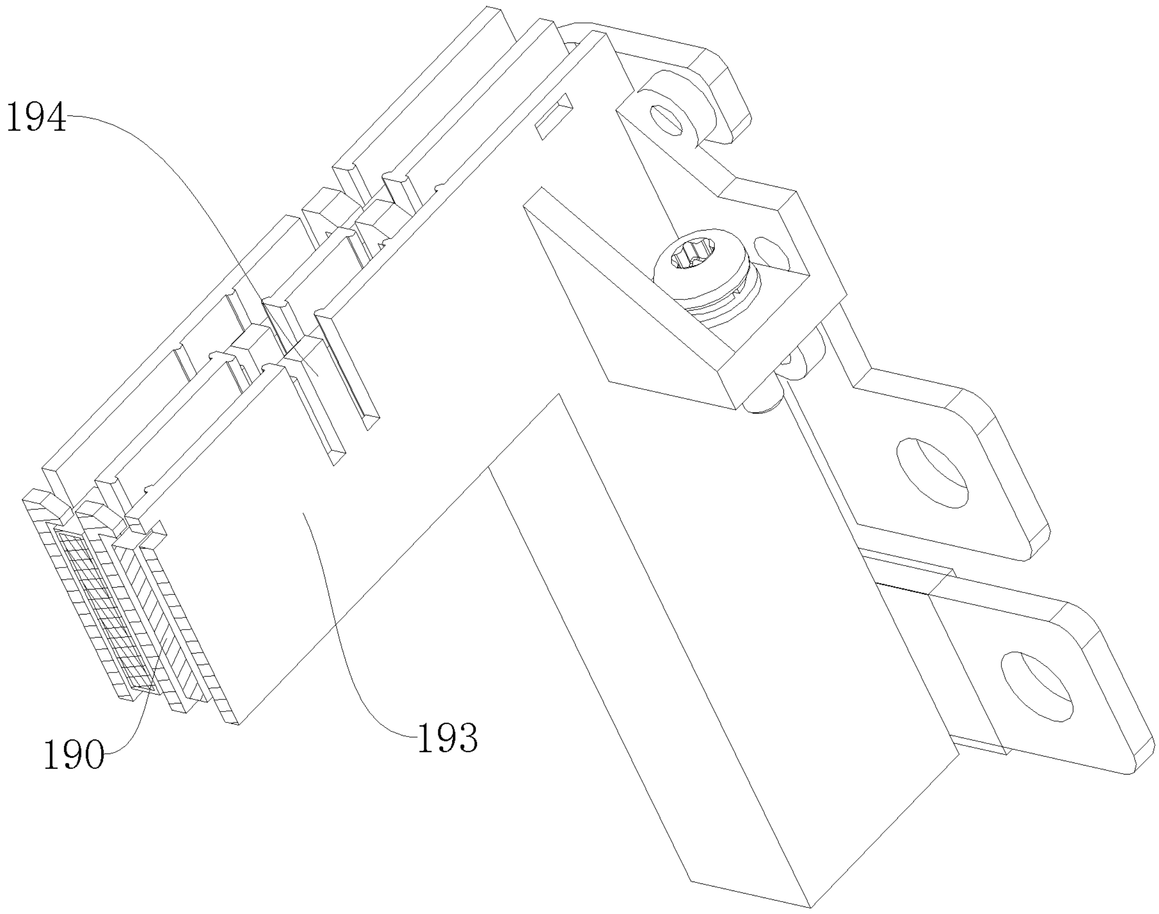
FIG. 11 is a schematic diagram of connection between a direct-current conductive bar and an insulating member of a motor controller according to an embodiment of the present disclosure.
Figure 12:
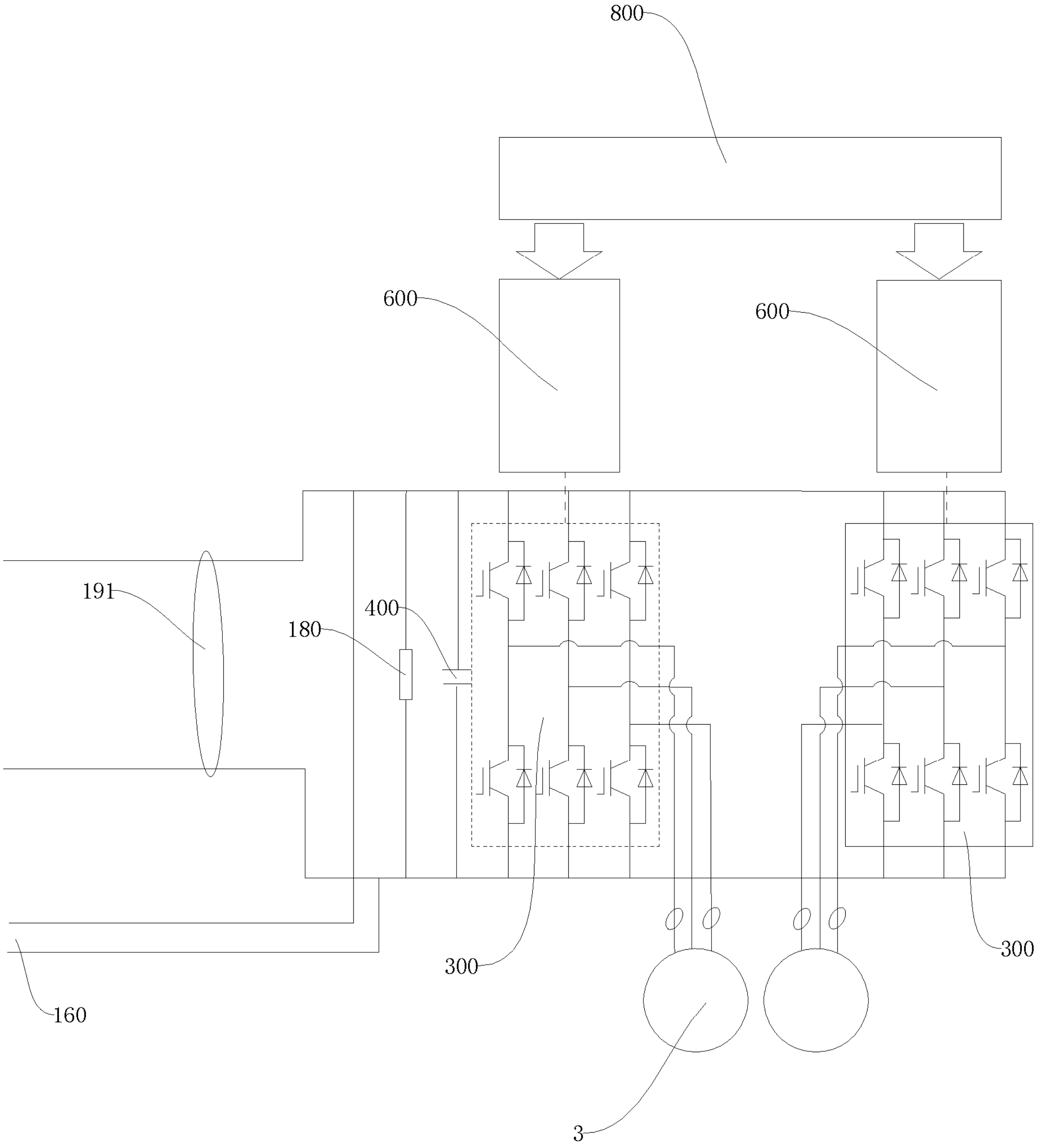
FIG. 12 is a circuit diagram of a motor controller according to an embodiment of the present disclosure.

As shown in FIG. 1, FIG. 2, and FIG. 6, the motor controller 1 further includes a water inlet pipe 250 and a water outlet pipe 260. The water inlet pipe 250 and the water outlet pipe 260 are respectively connected to two ends of the first box body 100 along the length direction of the first box body 100, the first box body 100 is provided with a water inlet channel 270 and a water outlet channel 280, the water inlet channel 270 is connected to the water inlet pipe 250 and a cooling cavity 230 that is closest to the water inlet pipe 250 (e.g., a first cooling cavity), and the water outlet channel 280 is connected to the water outlet pipe 260 and a cooling cavity 230 that is closest to the water outlet pipe 260 (e.g., a second cooling cavity).

In this way, the coolant may flow in a length direction of the motor controller 1, so that the cooling water passage 200 has a longer path, the coolant can be fully utilized, and the coolant can fully dissipate heat for the IGBT module 300 and the capacitor 400.

The water inlet pipe 250 may be provided in a side surface in a circumferential direction of the first box body 100 that is adjacent to the water inlet channel 270, so as to be connected to the water inlet channel 270 and input the coolant, and similarly, the water outlet pipe 260 may be provided in a side surface in the circumferential direction of the first box body 100 that is adjacent to the water outlet channel 280, so as to be connected to the water outlet channel 280 and output the coolant.

Further, as shown in FIG. 2, the water inlet channel 270 includes a first water inlet section 271 and a second water inlet section 272, the first water inlet section 271 is connected to the water inlet pipe 250, and the second water inlet section 272 is connected to the first water inlet section 271 and the cooling cavity 230 that is closest to the water inlet pipe 250. In this way, the water inlet pipe 250 may be in communication with the cooling cavity 230, and the coolant may flow from the water inlet pipe 250 through the first water inlet section 271 and the second water inlet section 272 sequentially into the cooling cavity 230.

The first water inlet section 271 offsets toward the second surface 120 with respect to the first cooling cavity 230 that is closest to the water inlet pipe. That is, the first water inlet section 271 may be parallel to the cooling cavity 230. In this case, the water inlet pipe 250 is located between the first surface 110 and the second surface 120, so that a volume of the first box body 100 is reduced while leakage of the coolant is prevented.

For example, the second water inlet section 272 may be perpendicular to the cooling cavity 230 and the first water inlet section 271 in the thickness direction of the first box body 100. In an embodiment, the second water inlet section 272 may be arranged obliquely relative to the thickness direction of the first box body 100, that is, an angle between the second water inlet section 272 and the cooling cavity 230 is not a right angle, an angle between the second water inlet section 272 and the first water inlet section 271 is also not a right angle, and orthographic projections of the first water inlet section 271 and the second water inlet section 272 toward the first surface 110 do not overlap each other. In this way, on one hand, the water inlet channel 270 is closer to the capacitor 400, and the coolant in the water inlet channel 270 may cool the capacitor 400; and on the other hand, there is no right angle or acute angle at a position where the water inlet channel 270 is connected to the cooling cavity 230, so that flowing of the coolant is smoother and gentle.

Similarly, the water outlet channel 280 includes a first water outlet section 281 and a second water outlet section 282, the first water outlet section 281 is connected to the water outlet pipe 260, and the second water outlet section 282 is connected to the first water outlet section 281 and the cooling cavity 230 that is closest to the water outlet pipe 260. In this way, the water outlet pipe 260 may be in communication with the cooling cavity 230, and the coolant may flow from the cooling cavity 230 through the second water outlet section 282 and the first water outlet section 281 sequentially into the water outlet pipe 260.

The first water outlet section 281 offsets toward the second surface 120 with respect to the second cooling cavity 230 that is closest to the water outlet pipe 260. That is, the first water outlet section 281 may be parallel to the cooling cavity 230. In this case, the water outlet pipe 260 is located between the first surface 110 and the second surface 120, so that the volume of the box body is reduced while leakage of the coolant is prevented.

For example, the second water outlet section 282 may be perpendicular to the cooling cavity 230 and the first water outlet section 281 in the thickness direction of the first box body 100. In an embodiment, the second water outlet section 282 may be arranged obliquely relative to the thickness direction of the first box body 100, that is, an angle between the second water outlet section 282 and the cooling cavity 230 is not a right angle, an angle between the second water outlet section 282 and the first water outlet section 281 is also not a right angle, and orthographic projections of the first water outlet section 281 and the second water outlet section 282 toward the first surface 110 do not overlap each other. In this way, on one hand, the water outlet channel 280 is closer to the capacitor 400, and the coolant in the water outlet channel 280 may cool the capacitor 400; and on the other hand, there is no right angle or acute angle at a position where the water outlet channel 280 is connected to the cooling cavity 230, so that flowing of the coolant is smoother and gentle.

According to some embodiments of the present disclosure, as shown in FIG. 2 and FIG. 6, the motor controller 1 further includes multiple drive boards 600, a second box body 700, a control board 800, and a control cover plate 900.

The multiple drive boards 600 are arranged on the first surface 110 and are respectively connected to the multiple IGBT modules 300, the second box body 700 is mounted on the first box body 100, the multiple drive boards 600 are located between the second box body 700 and the first box body 100, the control board 800 is located on a side of the second box body 700 that faces away from the first box body 100 and is connected to the multiple drive boards 600, the control cover plate 900 is mounted on the second box body 700, and the control board 800 is located between the control cover plate 900 and the second box body 700.

For example, a vehicle may include multiple motors 3, the multiple motors 3 include a driving motor and an electric generator, the multiple drive boards 600 may include a drive board 600 connected to the driving motor and a drive board 600 connected to the electric generator, and the multiple drive boards 600 be integrated. The control board 800 sends a control signal to the drive boards 600, so that the drive boards 600 may drive corresponding vehicle motors 3 to rotate at different rotation speeds and in different directions, and the control board 800 may receive signals fed back during running of the vehicle motors 3, so as to adjust the rotation speeds and control the directions of the vehicle motors 3 in time. In addition, the control board 800 may be connected to the drive boards 600 through conductive members such as a cable or a connector.

In addition, the control board 800 may be fixedly connected to the first box body 100, and the drive boards 600 may be fixedly connected to the second box body 700, so that electrical connection is more reliable. In addition, the second box body 700 can separate the control board 800 and the drive boards 600, so that electromagnetic interference between the drive boards 600 and the control board 800 is small, and the control cover plate 900 can cover the control board 800 on the second box body 700, so that movement of the control board 800 relative to the second box body 700 is prevented, and the control board 800 can be protected.

Based on this, the capacitor 400, the IGBT module 300, the drive board 600, and the control board 800 are respectively located in different cavities, and interference among the power members is small, which helps improve an electromagnetic compatibility (EMC) effect.

In some embodiments of the present disclosure, as shown in FIG. 7 to FIG. 12, the motor controller 1 further includes a signal connector 140, an electric assembly signal connector 150, a power distribution connector 160, a direct-current bus connector 170, and a bleeder resistor 180.

For example, the signal connector 140 is connected to the control board 800 and is configured to exchange signals with another electric member of the vehicle.

The power distribution connector 160 is connected to a power distribution connector signal line, the power distribution connector signal line runs through the second box body 700 to be connected to the control board 800, the power distribution connector 160 is connected to the capacitor 400, and the power distribution connector 160 may be configured to supply power to an air conditioner of the vehicle.

The direct-current bus connector 170 is mounted in the second box body 700 and is exposed from the second box body 700, and the direct-current bus connector 170 is connected to the capacitor 400 through the direct-current conductive bar 190 to charge the capacitor 400. The direct-current conductive bar 190 is wrapped by an insulating member 193. For example, the insulating member 193 is injection-molded, the insulating member 193 is provided with a fastener 194 configured to fix the direct-current conductive bar 190, and the direct-current conductive bar 190 is detachably mounted on the insulating member 193. A magnetic ring 191 is sleeved on the direct-current conductive bar 190, and the direct-current conductive bar 190 may be coated with an insulating glue 192 to ensure safety. The direct-current conductive bar 190 may be vertically placed to save space, a side of the second box body 700 is provided with an opening configured to mount the direct-current bus connector 170, and the opening is covered by a direct-current cover plate, so that a size of the motor controller 1 is effectively reduced. Therefore, space of the motor controller 1 is saved and a weight of the motor controller 1 is reduced. In addition, the bleeder resistor 180 is connected to the capacitor 400 through the direct-current conductive bar 190, and the bleeder resistor 180 is configured to consume a battery level in the capacitor 400 when the vehicle stops, thereby improving the reliability.

The motor controller 1 may be connected to a motor assembly 2, the multiple motors 3 are mounted on the motor assembly 2, each IGBT module 300 is connected to a corresponding motor 3 through a three-phase conductive bar 340 and a three-phase connection bar 350, and the three-phase connection bar 350 may be vertically arranged to save space. The electric assembly signal connector 150 is connected to a rotary-transformer connector, a temperature rise sensor connector, and a transmission control unit (TCU) connector. The electric assembly signal connector 150 is connected to the motor assembly 2 and is configured to detect an angular velocity, an angular displacement, a temperature, and hydraulic pressure of the motor 3, and the rotary-transformer connector, the temperature rise sensor connector, and the TCU connector share one plug, which facilitates wire harness fixing.

Each drive board 600 is connected to a hall 360, and the IGBT module 300 corresponding to each drive board 600 runs through the hall 360 connected to the drive board 600 to be connected to the corresponding motor 3, to detect a voltage and a current that are inputted to the motor 3.

The capacitor 400 may be connected to two groups of anti-interference laminated busbar-type output conductive bars, and the output conductive bars are respectively connected to the multiple IGBT modules 300. The capacitor 400 is further connected to a ground conductive bar 440, and the ground conductive bar 440 is configured to ground a Y capacitor in the capacitor. The capacitor 400 is further provided with an input port 460 and a power distribution port 450, where the input port 460 is connected to the direct-current bus connector 170, and the power distribution port 450 is connected to the power distribution connector 160.

The following describes a vehicle according to the embodiments of the present disclosure with reference to the accompanying drawings, and the vehicle includes the motor controller 1 according to the foregoing embodiments of the present disclosure.

The vehicle according to the embodiments of the present disclosure utilizes the motor controller 1 described in the foregoing embodiments of the present disclosure, so that the vehicle has advantages such as a small volume, a light weight, low costs, and high cooling efficiency.

Other compositions and operations of the motor controller 1 and the vehicle including the motor controller according to the embodiments of the present disclosure are known to a person of ordinary skill in the art, and are not described in detail herein again.

In the description of this specification, the description of the reference terms such as "an embodiment", "some embodiments", "an exemplary embodiment", "an example", "a specific example", or "some examples" means that features, structures, materials or characteristics described with reference to the embodiment or example are included in at least one embodiment or example of the present disclosure. In this specification, the schematic description of the foregoing terms does not necessarily indicate a same embodiment or example.

Some of the embodiments of the present disclosure have been shown and described. A person of ordinary skill in the art should understand that various changes, modifications, replacements and variations may be made to the embodiments without departing from the principles and spirit of the present disclosure, and the scope of the present disclosure is as defined by the appended claims and equivalents thereof.

What is claimed is:

1. A motor controller, comprising:

a first box body comprising a first surface and a second surface opposite to each other along a thickness direction of the first box body, the first box body comprising a cooling water passage, the cooling water passage comprising at least one first opening on the first surface, and the second surface comprising a heat dissipation recess;

at least one insulate-gate bipolar transistor (IGBT) module disposed on the first surface and inserted into the cooling water passage through the at least one first opening;

a capacitor, the capacitor disposed on the second surface and connected to the IGBT module, the capacitor comprising a housing and a capacitor core, the capacitor core disposed in the housing, the housing comprising a heat dissipation opening configured to expose the capacitor core, and a surface of the capacitor that faces the second surface comprising a heat dissipation protrusion, the heat dissipation protrusion matching the heat dissipation recess, and the heat dissipation opening being disposed on the heat dissipation protrusion; and a heat conductor, the heat conductor covering the heat dissipation opening, and a first side surface of the heat conductor being in contact with the capacitor core and a second side surface of the heat conductor being in direct surface contact with an outer wall surface of the cooling water passage.

2. The motor controller according to claim 1, wherein the heat conductor comprises at least one of a heat conducting plate or a heat conducting mud.

3. The motor controller according to claim 1, wherein:

the heat conductor comprises a heat conducting plate and a heat conducting mud; and the heat conducting plate and the heat conducting mud are stacked along a direction from the capacitor core to the outer wall surface of the cooling water passage.

4. The motor controller according to claim 1, wherein the first box body comprises an accommodating groove, the second surface forms a groove bottom of the accommodating groove, the capacitor is disposed in the accommodating groove, a capacitor cover plate is mounted on the first box body, and the capacitor cover plate covers the accommodating groove.

5. The motor controller according to claim 1, wherein:

the cooling water passage comprises at least one transition cavity and a plurality of cooling cavities that are in communication with each other, the at least one transition cavity and the cooling cavities are alternately arranged along an extension direction of the cooling water passage, and each of the cooling cavities comprises a first opening on the first surface;

the motor controller further comprises a plurality of IGBT modules including the IGBT module and a plurality of heat conductors including the heat conductor, and the IGBT modules are respectively inserted into the cooling cavities through the first openings; and the housing comprises a plurality of heat dissipation openings, the heat conductors respectively cover the heat dissipation openings, a first side surface of each of the heat conductors is in contact with the capacitor core, and a second side surface of each of the heat conductors is in contact with an outer wall surface of a corresponding cooling cavity.

6. The motor controller according to claim 5, wherein each of the IGBT modules comprises an insertion portion and a mounting portion that are connected to each other, a cross-sectional area of the mounting portion is greater than a cross-sectional area of the insertion portion, the mounting portion is located outside the corresponding cooling cavity and is mounted on the first surface, and the insertion portion is inserted into the corresponding cooling cavity through a corresponding first opening.

7. The motor controller according to claim 5, wherein the first surface comprises a plurality of sealing grooves, the sealing grooves respectively surround the first openings, and a sealing ring configured to seal a corresponding IGBT module is disposed in each of the sealing grooves.

8. The motor controller according to claim 5, further comprising a water passage cover plate, the at least one transition cavity comprising a second opening on the second surface, and the water passage cover plate being mounted on the second surface and covering the second opening.

9. The motor controller according to claim 5, wherein the at least one transition cavity comprises a connection section and an open section, the second opening is disposed on the open section, the connection section is disposed on two ends of the open section and is in communication with an adjacent cooling cavity, and the open section offsets toward the second surface with respect to the adjacent cooling cavity.

10. The motor controller according to claim 5, wherein the at least one transition cavity and the plurality of cooling cavities are disposed along a length direction of the first box body.

11. The motor controller according to claim 5, further comprising:

a plurality of drive boards disposed on the first surface, and the drive boards being respectively connected to the IGBT modules;

a second box body mounted on the first box body, and the drive boards being located between the second box body and the first box body;

a control board located on a surface of the second box body that faces away from the first box body and being connected to the drive boards; and a control cover plate mounted on the second box body, and the control board being located between the control cover plate and the second box body.

12. The motor controller according to claim 1, further comprising:

a water inlet pipe and a water outlet pipe, the water inlet pipe and the water outlet pipe being respectively connected to two ends of the first box body along a length direction of the first box body, the first box body comprising a water inlet channel and a water outlet channel, the water inlet channel being connected to the water inlet pipe and a first cooling cavity that is closest to the water inlet pipe, and the water outlet channel being connected to the water outlet pipe and a second cooling cavity that is closest to the water outlet pipe.

13. The motor controller according to claim 12, wherein:

the water inlet channel comprises a first water inlet section and a second water inlet section, the first water inlet section is connected to the water inlet pipe, the second water inlet section is connected to the first water inlet section and the first cooling cavity, and the first water inlet section offsets toward the second surface with respect to the first cooling cavity; and the water outlet channel comprises a first water outlet section and a second water outlet section, the first water outlet section is connected to the water outlet pipe, the second water outlet section is connected to the first water outlet section and the second cooling cavity, and the first water outlet section offsets toward the second surface with respect to the second cooling cavity.

14. A vehicle, comprising a motor controller, wherein the motor controller comprises:

a first box body comprising a first surface and a second surface opposite to each other along a thickness direction of the first box body, the first box body comprising a cooling water passage, the cooling water passage comprising at least one first opening on the first surface, and the second surface comprising a heat dissipation recess;

at least one insulate-gate bipolar transistor (IGBT) module disposed on the first surface and inserted into the cooling water passage through the at least one first opening;

a capacitor, the capacitor disposed on the second surface and connected to the IGBT module, the capacitor comprising a housing and a capacitor core, the capacitor core disposed in the housing, the housing comprising a heat dissipation opening configured to expose the capacitor core, and a surface of the capacitor that faces the second surface comprising a heat dissipation protrusion, the heat dissipation protrusion matching the heat dissipation recess, and the heat dissipation opening being disposed on the heat dissipation protrusion; and a heat conductor, the heat conductor covering the heat dissipation opening, and a first side surface of the heat conductor being in contact with the capacitor core and a second side surface of the heat conductor being in direct surface contact with an outer wall surface of the cooling water passage.

15. The vehicle according to claim 14, wherein the heat conductor comprises at least one of a heat conducting plate or a heat conducting mud.

16. The vehicle according to claim 14, wherein:

the heat conductor comprises a heat conducting plate and a heat conducting mud; and the heat conducting plate and the heat conducting mud are stacked along a direction from the capacitor core to the outer wall surface of the cooling water passage.

17. The vehicle according to claim 14, wherein the first box body comprises an accommodating groove, the second surface forms a groove bottom of the accommodating groove, the capacitor is disposed in the accommodating groove, a capacitor cover plate is mounted on the first box body, and the capacitor cover plate covers the accommodating groove.

18. The vehicle according to claim 14, wherein:

the cooling water passage comprises at least one transition cavity and a plurality of cooling cavities that are in communication with each other, the at least one transition cavity and the cooling cavities are alternately arranged along an extension direction of the cooling water passage, and each of the cooling cavities comprises a first opening on the first surface;

the motor controller further comprises a plurality of IGBT modules including the IGBT module and a plurality of heat conductors including the heat conductor, and the IGBT modules are respectively inserted into the cooling cavities through the first openings; and the housing comprises a plurality of heat dissipation openings, the heat conductors respectively cover the heat dissipation openings, a first side surface of each of the heat conductors is in contact with the capacitor core, and a second side surface of each of the heat conductors is in contact with an outer wall surface of a corresponding cooling cavity.

* * * * *